(12) United States Patent
Kwan

(10) Patent No.: US 6,858,056 B2
(45) Date of Patent: Feb. 22, 2005

(54) OIL SEPARATOR

(75) Inventor: Williams Ching-To Kwan, Berlin (DE)

(73) Assignee: Rolls-Royce Deutschland Ltd & Co KG, Dahlewite (DE)

( * ) Notice: Subject to any disclaimer, the term of this patent is extended or adjusted under 35 U.S.C. 154(b) by 13 days.

(21) Appl. No.: 10/256,131

(22) Filed: Sep. 27, 2002

(65) Prior Publication Data

US 2003/0089656 A1 May 15, 2003

(30) Foreign Application Priority Data

Sep. 28, 2001 (DE) .......................... 101 48 000

(51) Int. Cl.[7] .............................................. B01D 46/26
(52) U.S. Cl. ............................. 55/400; 55/401; 95/277
(58) Field of Search ............................. 95/277; 55/400, 55/401, 406, 408, 409

(56) References Cited

U.S. PATENT DOCUMENTS

| | | | | |
|---|---|---|---|---|
| 1,051,017 A | * | 1/1913 | Schmidt ..................... 261/90 |
| 3,018,896 A | * | 1/1962 | Lucien ...................... 210/403 |
| 3,045,411 A | * | 7/1962 | Dalrymple .................. 55/400 |
| 3,289,397 A | * | 12/1966 | Schonewald et al. ......... 55/392 |
| 3,708,957 A | * | 1/1973 | Labadie ..................... 95/277 |
| 3,800,514 A | * | 4/1974 | Avondoglio et al. .......... 55/319 |
| 4,049,401 A | * | 9/1977 | Smith ........................ 55/401 |
| 4,189,310 A | * | 2/1980 | Hotta ......................... 55/317 |
| 4,714,139 A | * | 12/1987 | Lorenz et al. .............. 184/6.11 |
| 4,903,462 A | * | 2/1990 | Nagashima et al. .......... 55/317 |
| 4,908,050 A | * | 3/1990 | Nagashima et al. .......... 55/400 |
| 4,981,502 A | * | 1/1991 | Gottschalk ................... 55/400 |
| 4,984,625 A | * | 1/1991 | Lichtfuss ............... 165/104.25 |
| 5,716,423 A | * | 2/1998 | Krul et al. .................... 55/485 |
| 6,033,450 A | * | 3/2000 | Krul et al. .................... 55/345 |
| 6,139,595 A | * | 10/2000 | Herman et al. ............... 55/312 |
| 6,398,833 B1 | * | 6/2002 | Santerre et al. ............... 55/409 |
| 6,627,166 B1 | * | 9/2003 | Simon ........................ 423/210 |
| 6,640,792 B2 | * | 11/2003 | Harvey et al. ............... 123/572 |
| 2003/0136264 A1 | * | 7/2003 | Keller ......................... 95/277 |

FOREIGN PATENT DOCUMENTS

DE      19826105      12/1999
DE      19938769      3/2000

\* cited by examiner

*Primary Examiner*—Duane S. Smith
(74) *Attorney, Agent, or Firm*—Harbin King & Klima

(57) ABSTRACT

An oil separator includes a casing 1 and a rotor 2, said rotor being arranged rotatably within said casing and having a flow chamber 3 through which oil-laden air 4 can pass, with porous material being arranged in the flow chamber 3. At least one unit of porous material is arranged in the flow chamber 3 which includes outer layers of a porous metal 6 and an interlaid layer 7 comprising fibre material.

19 Claims, 4 Drawing Sheets

OIL SEPARATOR

This application claims priority to German Patent Application DE10148000.8, which application is incorporated by reference herein.

BACKGROUND OF THE INVENTION

This invention relates to an oil separator with a casing in which a rotor is rotatably arranged, said rotor having a flow chamber through which oil-laden air can flow and said flow chamber containing a porous material.

In particular, this invention relates to an oil separator for use in an aero gas turbine.

In the prior art, the air flowing through aero gas turbines is passed through an oil separator in order to separate minute oil droplets carried in the air.

Various designs of such oil separators are known in the prior art. For example, these can be provided as stationary elements in vent covers in order to separate the oil particles from the air flow in which they are carried.

In the field of aero gas turbines, separators of the rotor type, as specified above, are known. Here, the porous material contained in the flow chamber or in the blades of the rotor is provided in the form of a metallic spongiose element. This material is commercially available under the brand name RETIMET®, for example. Such metal sponges are made by the application of a vapour coat or the deposition of metallic materials, such as nickel or chrome-nickel alloys, on plastic bases. The spongiose plastic bases are subsequently removed, which results in a porous latticework element. This element is machineable mechanically, can be formed into a great variety of shapes and features good mechanical strength properties.

In the case of centrifugal oil separators of the type according to this invention, the oil-laden air passes the rotating flow chamber, in which the oil-laden air is subjected to centrifugal or centripetal forces. Due to their difference in mass, the air particles and the fine oil particles are subject to different forces. The oil particles are moved radially outward by centrifugal action and unite with other oil particles, finally forming minute droplets which can be discharged from the rotor.

In the case of aero gas turbines, the passing air will be laden with oil, particularly in the bearing areas where the suction force of the airflow removes bearing oil. Separation of oil from the air is not only desirable for environmental reasons but also for re-feeding the separated oil into the lube-oil circulation system.

A disadvantage of the known types of oil separators lies in their inability to remove the finest oil particles from the air. Accordingly, the discharging air is still laden with oil mist or oil fog, which is visible to passengers or airport personnel as oil fog exiting from the engine and which may lead to irritations.

BRIEF SUMMARY OF THE INVENTION

In a broad aspect, the present invention provides an oil separator of the type specified at the beginning above which combines simplicity of design and straightforward, safe operability with the ability to separate even the finest oil particles from the air flow passing through it.

It is a particular object of the present invention to provide remedy to the above problems by the features cited in claim 1, with further advantages becoming apparent from the sub-claims and the description below.

Accordingly, the present invention provides for the arrangement of at least one element of a porous material in the flow chamber, this element including outer layers made of a porous metal and an interlaid layer made of a fibre material, for example, glass fibre.

The oil separator according to the present invention features a variety of merits.

The provision made by the present invention for passing the oil-laden air through a layer of fibre material allows finer oil particles to be removed than which would be sufficiently separated by the relatively large pores of the porous metal. This means that the air will be cleaned much more intensively.

Due to the insufficient stability in shape of the fibre material, the flow chamber cannot be filled directly and exclusively with fibre material or a fibre material meshwork or fabric. Under the centrifugal forces arising, the fibre material meshwork or fabric would rapidly loose its shape and become lodged in the radially outward area of the flow chamber. This would compromise the adequate cleaning of the passing air flow.

The solution as provided by the present invention, namely to surround and enclose the layer comprising fibre material with an outer layer of porous metal, provides for excellent stability in shape. The porous metal will take up the forces arising, with the load exerted on the fibre material proper being kept very low. This enables the arrangement to maintain its shape in the flow chamber.

The present invention, therefore, provides for a layer-type, laminate-type arrangement of the porous material.

In a possible embodiment of the present invention, the layer of fibre material is enclosed by porous metal at its axial sides and at its radially outward side.

In order to enhance the stability in shape of the layer comprising fibre material, it may be advantageous to enclose it in a grid-type intermediate casing. This casing may be provided as a wire grid or a similar arrangement.

In the case of somewhat thicker layers of fibre-material, it may be favourable to provide for additional support. According to the present invention, such support can be provided by at least one axial spacer element which avoids compression of the layer comprising fibre material.

It may further be advantageous to provide for at least one radial supporting element in order to prevent the fibre-material layer from being dislocated or displaced under centrifugal action. Here, it is particularly advantageous to provide the supporting element in the form of a gauze-type meshwork.

When the oil-particle or oil-mist laden air flows by the oil separator, the fibre material causes the oil particles to coalesce and to form a macroscopic liquid phase. As the air flows on, this liquid phase is captured in the porous metal and discharged. This gives rise to a particularly fine filtration or separation which enables the oil mist or oil fog to be removed with high efficiency.

BRIEF DESCRIPTION OF THE DRAWINGS

The present invention is more fully described in light of the accompanying drawings showing a preferred embodiment. On the drawings.

DETAILED DESCRIPTION OF THE INVENTION

Figure 1:
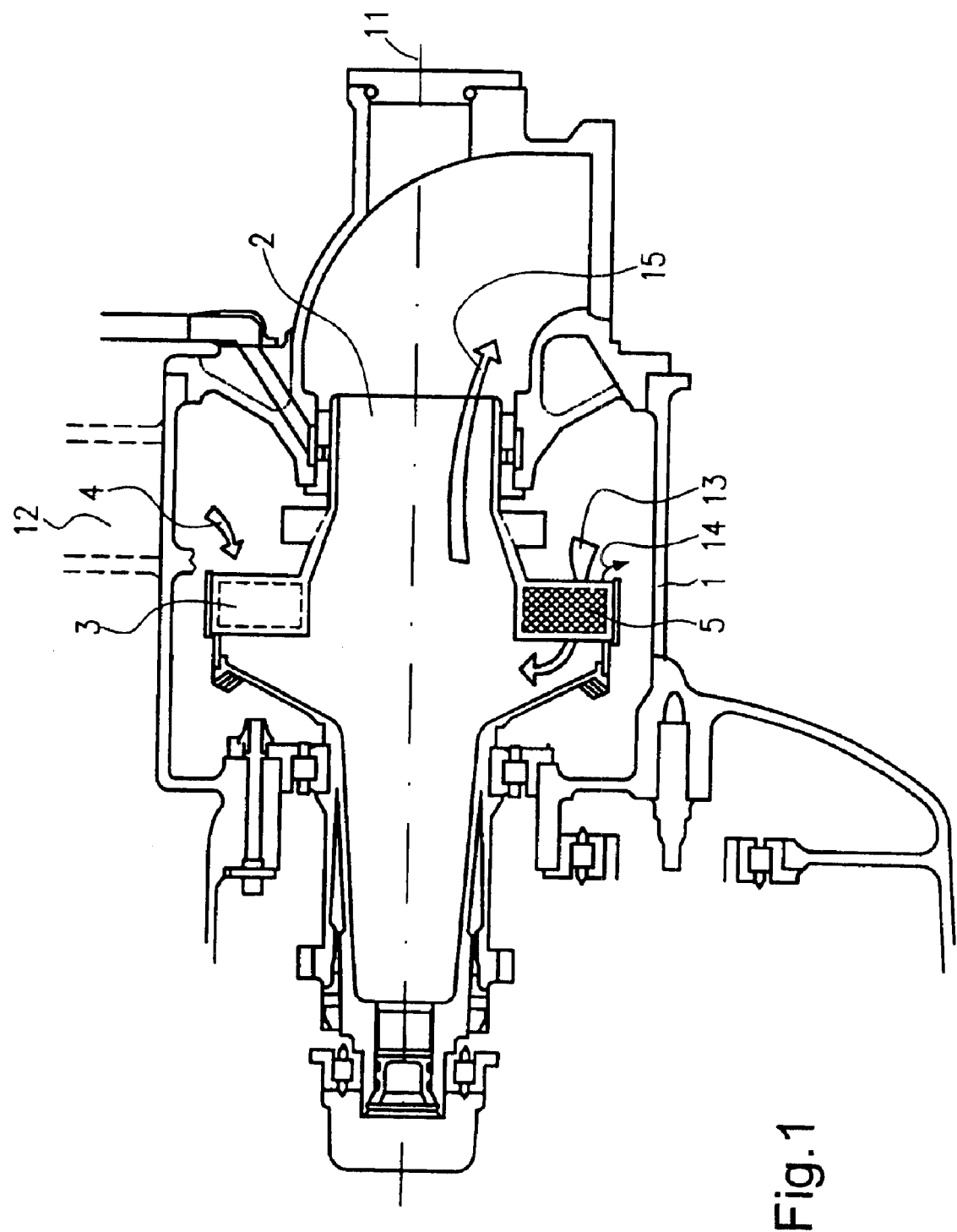
FIG. 1 is a simplified sectional view of a centrifugal oil separator.

FIG. 1 shows in highly simplified representation a casing 1 in which a rotor 2 is rotatably mounted. Rotation is about a rotational axis 11. Oil-laden air 4 enters via an inlet 12. The rotor 2 has an annular flow chamber 3 in which porous material 5 is arranged. The porous material 5 is hereinafter described more specifically with reference to FIG. 2.

As indicated by the arrowhead 13, the air passes through the flow chamber 3 in which it is separated from the oil particles. These are discharged from the rotor as oil flow, as indicated by the arrowhead 14. Subsequently, the air leaves the rotor 2, as indicated by the arrowhead 15, and is discharged from the casing 1.

Figure 2:
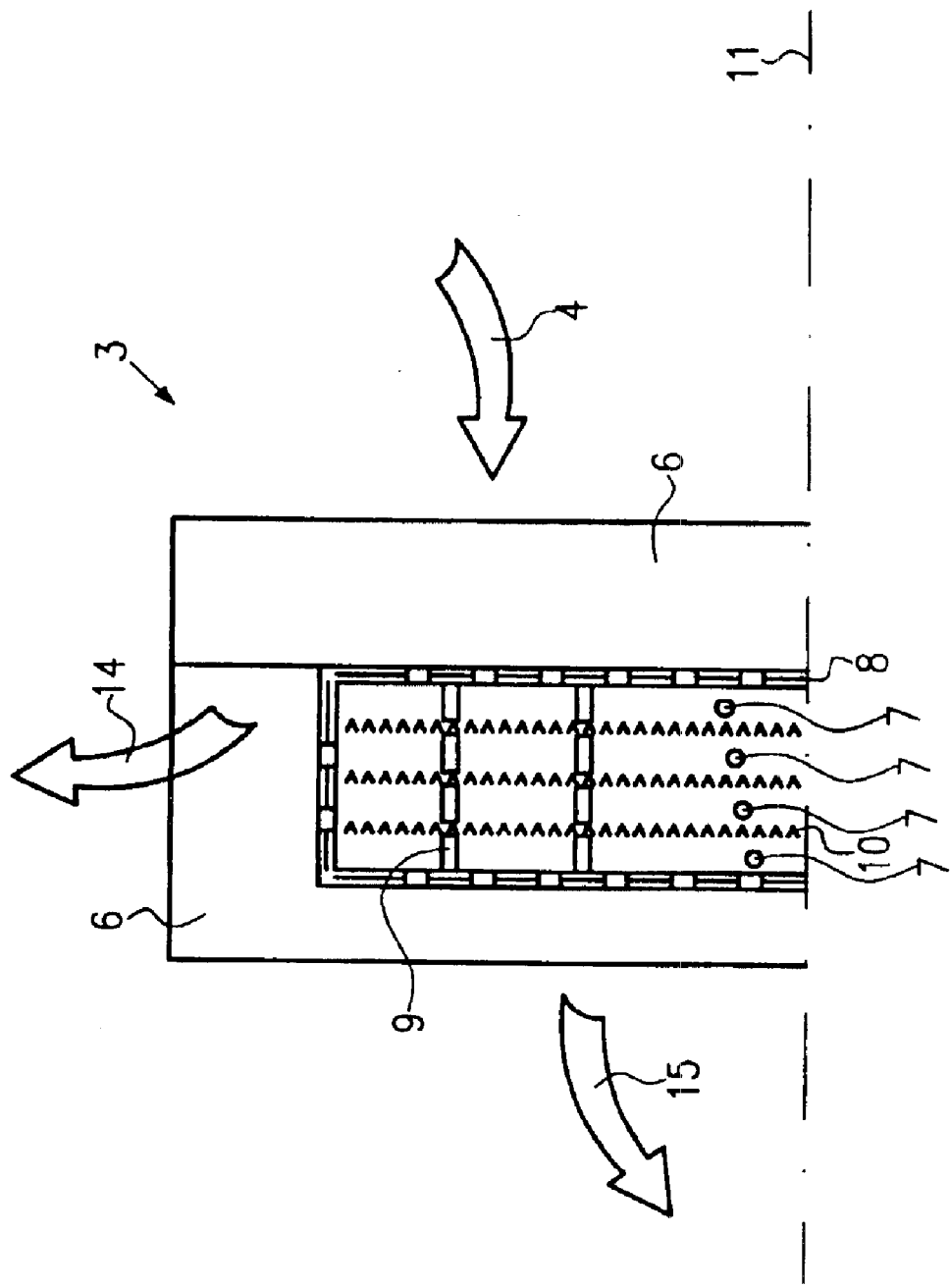
FIG. 2 is a partial sectional view of the flow chamber according to the present invention with the porous material according to the present invention.

FIG. 2 is a highly simplified representation of the arrangement of the porous material in the flow chamber 3 according to the present invention. The porous material 5 comprises axial outer layers of a porous metal, for example RETIMET® metallic sponge. As shown in FIG. 2, a radial outer layer of porous metal 6 is also provided. The porous metal 6 has a spacing in which an intermediate casing 8 is arranged, this intermediate casing 8 being of a grid-type and provided with pores and openings. Several layers 7 are arranged in this intermediate casing 8 which consist of, or comprises, fiber material. This fibre material may be gauze, fabric or meshwork.

In order to support and retain the layers 7 of fibre material, several axial spacer elements 9 and grid-type supporting elements 10 are provided.

Figure 3:
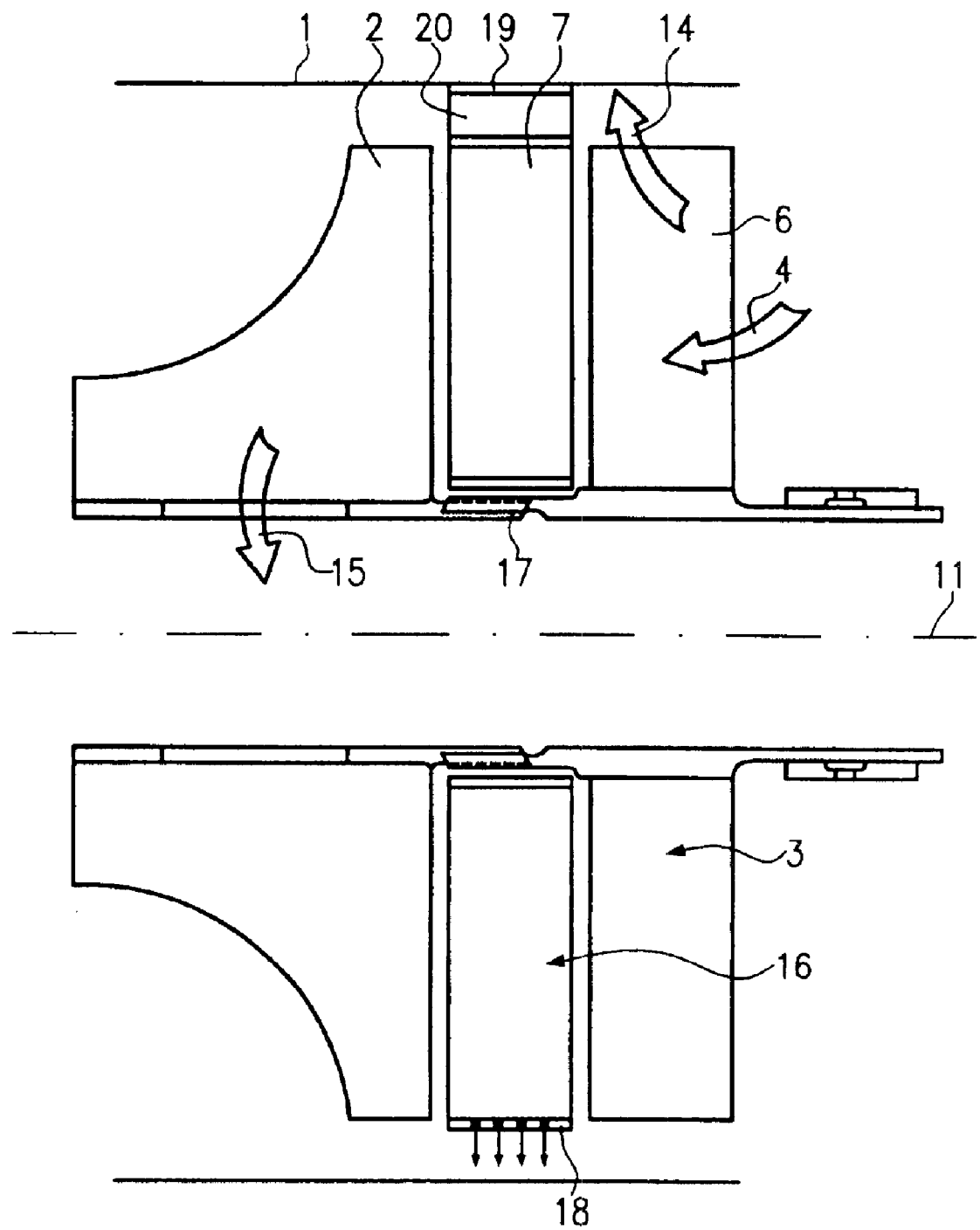
FIG. 3 is a simplified sectional side view of a further embodiment of the oil separator according to the present invention.
Figure 4:
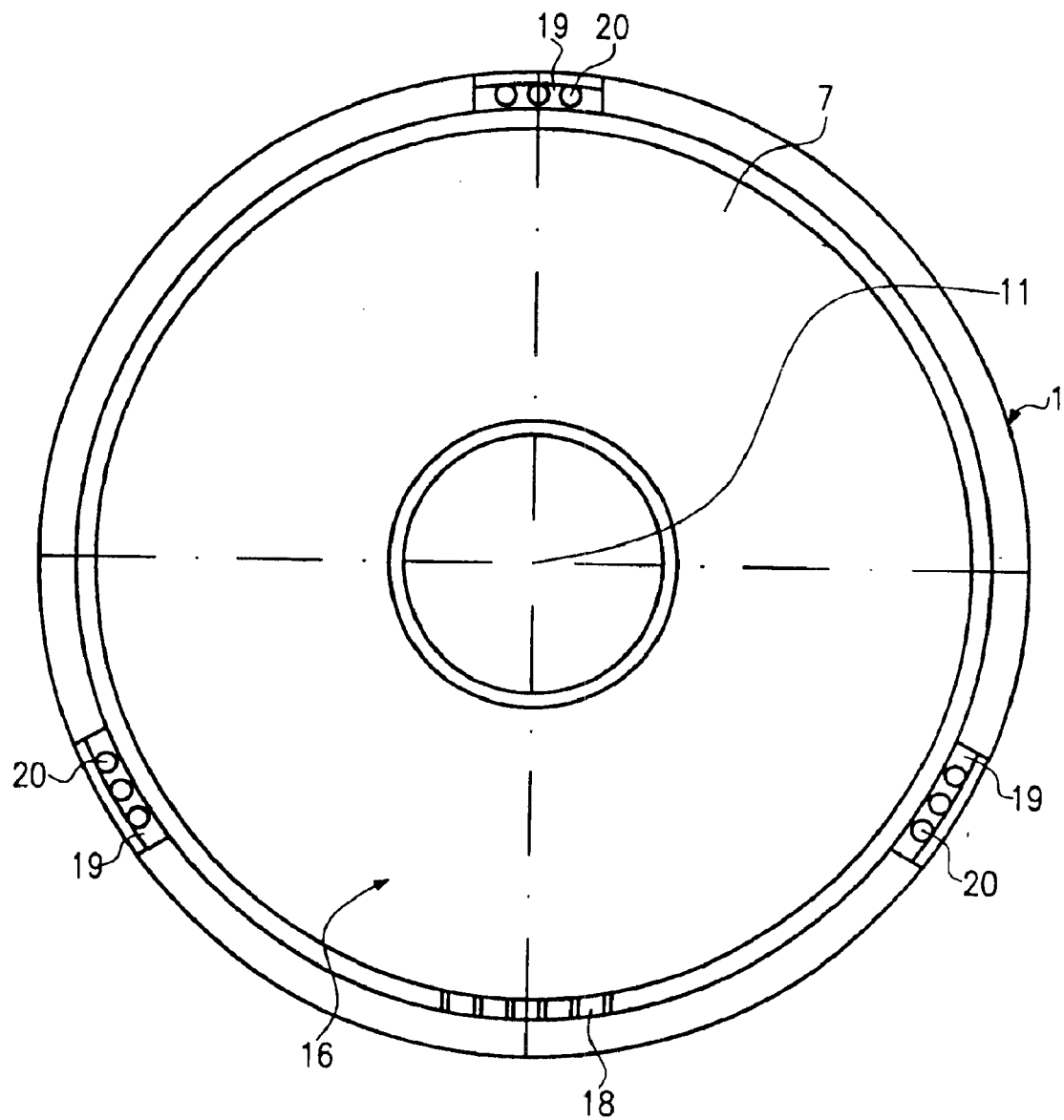
FIG. 4 is a central sectional view of the embodiment shown in FIG. 3.

In the embodiment shown in FIGS. 3 and 4, like items are indicated by the same reference numerals as in the embodiment in FIGS. 1 and 2.

As in the first embodiment, the rotor 2 rotates about the rotational axis 11. It comprises a flow chamber 3 which is filled with porous metal 6. Downstream of the flow chamber 3 is a second flow chamber 16 which is connected to the casing 1 acting as a stator. In the second flow chamber 16, at least one layer 7 comprising fibre material is arranged which can be designed similarly to the embodiment in FIGS. 1 and 2, particularly with regard to the spacer elements and the supporting elements.

As indicated by the arrowheads 14, an oil flow 14 is formed which contributes to the discharge of the separated oil particles. The flow of the oil-laden air is indicated by the arrowhead 4, while the flow of the cleaned air is shown by the arrowhead 15.

The components of the rotor 2 can be connected by a spline 17.

As illustrated in FIGS. 3 and 4, the second flow chamber 16 is connected to the casing by means of three struts 19, each of which contains several holes 20 in order not to affect the air stream. In the bottom area, several holes 18 are provided to enhance the discharge of oil.

A plurality of modifications may be made to the embodiments shown herein without detracting from the inventive concept.

What is claimed is:

1. An oil separator, including:
   a casing,
   a rotor, said rotor being rotatably mounted within said casing and including a flow chamber through which oil-laden air can flow, and
   a porous material through which the oil-laden air can flow positioned in the flow chamber, the porous material comprising an outer layer comprising a porous metal and an inner layer comprising a fiber materials,
   wherein the layer comprising fiber material is enclosed by the porous metal at its axial sides and at its radially outer side.

2. An oil separator in accordance with claim 1, wherein the layer comprising fibre material is enclosed in a grid form intermediate casing.

3. An oil separator in accordance with claim 2, wherein the layer comprising fiber material includes at least one axial spacing element.

4. An oil separator in accordance with claim 3, wherein the layer comprising fiber material includes at least one radial supporting element.

5. An oil separator in accordance with claim 4, wherein the supporting element is in the form of a gauze meshwork.

6. An oil separator, including:
   a casing,
   a rotor, said rotor being rotatably mounted within said casing and including a flow chamber through which oil-laden air can flow, and
   a porous material through which the oil-laden air can flow positioned in the flow chamber, the porous material comprising an outer layer comprising a porous metal and an inner layer comprising a fiber material,
   wherein the layer comprising fiber material is enclosed in a grid form intermediate casing.

7. An oil separator, including:
   a casing,
   a rotor, said rotor being rotatably mounted within said casing and including a flow chamber through which oil-laden air can flow, and
   a porous material through which the oil-laden air can flow positioned in the flow chamber, the porous material comprising an outer layer comprising a porous metal and an inner layer comprising a fiber material,
   wherein the layer comprising fiber material includes at least one axial spacing element.

8. An oil separator in accordance with claim 7, wherein the layer comprising fiber material includes at least one radial supporting element.

9. An oil separator in accordance with claim 8, wherein the supporting element is in the form of a gauze meshwork.

10. An oil separator, including:
    a casing,
    a rotor, said rotor being rotatably mounted within said casing and including a flow chamber through which oil-laden air can flow, and
    a porous material through which the oil-laden air can flow positioned in the flow chamber, the porous material comprising an outer layer comprising a porous metal and an inner layer comprising a fiber material,
    wherein the layer comprising fiber material includes at least one radial supporting element.

11. An oil separator, including:
    a casing,
    a rotor, said rotor being rotatably mounted within said casing and including a first flow chamber through which oil-laden air can flow, a first porous material through which the oil-laden air can flow positioned in the first flow chamber, the porous material comprising a porous metal, a second flow chamber through which the oil-laden air can flow positioned downstream of the first flow chamber, the second flow chamber being connected to the casing, and a layer comprising a fibre material through which the oil-laden air can flow positioned in the second flow chamber.

12. An oil separator in accordance with claim 11, wherein the layer comprising fiber material is enclosed in a grid form intermediate casing.

13. An oil separator in accordance with claim 12, wherein the layer comprising fiber material includes at least one axial spacing element.

14. An oil separator in accordance with claim 13, wherein the layer comprising fiber material includes at least one radial supporting element.

15. An oil separator in accordance with claim 14, wherein the supporting element is in the form of a gauze meshwork.

16. An oil separator in accordance with claim 11, wherein the layer comprising fiber material includes at least one axial spacing element.

17. An oil separator in accordance with claim 16, wherein the layer comprising fiber material includes at least one radial supporting element.

18. An oil separator in accordance with claim 17, wherein the supporting element is in the form of a gauze meshwork.

19. An oil separator in accordance with claim 11, wherein the layer comprising fiber material includes at least one radial supporting element.

* * * * *